(12) United States Patent
Ghiotti et al.

(10) Patent No.: US 12,510,881 B2
(45) Date of Patent: Dec. 30, 2025

(54) SYSTEM AND METHOD FOR ASSISTING AN OPERATOR IN OPERATIONS TO CHANGE A CONFIGURATION OF AN OPERATING MACHINE

(71) Applicant: SASIB S.P.A., Bologna (IT)

(72) Inventors: Roberto Ghiotti, Bologna (IT); Matteo Orsoni, Bologna (IT)

(73) Assignee: SASIB S.P.A., Bologna (IT)

( * ) Notice: Subject to any disclaimer, the term of this patent is extended or adjusted under 35 U.S.C. 154(b) by 392 days.

(21) Appl. No.: 17/920,368

(22) PCT Filed: Apr. 23, 2021

(86) PCT No.: PCT/IB2021/053376
§ 371 (c)(1),
(2) Date: Oct. 20, 2022

(87) PCT Pub. No.: WO2021/224711
PCT Pub. Date: Nov. 11, 2021

(65) Prior Publication Data
US 2023/0161327 A1    May 25, 2023

(30) Foreign Application Priority Data
May 7, 2020    (IT) .......................... 102020000010165

(51) Int. Cl.
*G05B 19/4155* (2006.01)
(52) U.S. Cl.
CPC ................ *G05B 19/4155* (2013.01); *G05B 2219/31103* (2013.01)
(58) Field of Classification Search
None
See application file for complete search history.

(56) References Cited

U.S. PATENT DOCUMENTS 3,908,800 A    9/1975   Drapeau
4,821,197 A    4/1989   Kenik et al.
(Continued)

FOREIGN PATENT DOCUMENTS

CN    109 164 777 A    1/2019
DE    100 64 217 A    7/2002
(Continued)

OTHER PUBLICATIONS

Communication under Article 94(3) EPC issued in European Patent Application No. 21720857.8, dated May 31, 2024, 7 pages.
(Continued)

*Primary Examiner* — Sean Shechtman
(74) *Attorney, Agent, or Firm* — DILWORTH IP, LLC (57) ABSTRACT

A system for assisting an operator in operations of assembling/disassembling and/or change of configuration of an operating machine including a plurality of first areas provided with respective first pieces to be dismounted from the operating machine or configured to receive respective second pieces to be mounted on the operating machine. The system includes a support structure having a plurality of second areas provided with the second pieces or configured to receive the first pieces; a plurality of warning devices, each being associated to a respective area of the first areas and/or second areas; and a control unit operatively connected to the warning devices and configured to perform a predetermined sequence of commands correlated to operations of a predetermined sequence of operations of assembling/disassembling and/or change of configuration of the operating machine. The control unit is configured to selectively activate and deactivate the warning devices according to the sequence of commands.

20 Claims, 3 Drawing Sheets

(56) References Cited

U.S. PATENT DOCUMENTS 6,074,329 A 6/2000 Hirano
10,585,440 B1 * 3/2020 Gariepy ................. G05D 1/247

FOREIGN PATENT DOCUMENTS

| DE | 10 2010 041 389 A1 | 3/2012 |
|---|---|---|
| EP | 2716578 A1 | 4/2014 |
| EP | 3 563 941 A1 | 11/2019 |
| WO | 2019201487 A1 | 10/2019 |
| WO | 2019224857 A1 | 11/2019 |

OTHER PUBLICATIONS

International Search Report issued in International Application No. PCT/IB2021/053376, issued Jun. 18, 2021, 2 pages.
EP Communication in related EP Application No. 21720857.8, dated Aug. 9, 2023.

* cited by examiner

SYSTEM AND METHOD FOR ASSISTING AN OPERATOR IN OPERATIONS TO CHANGE A CONFIGURATION OF AN OPERATING MACHINE

FIELD OF THE INVENTION

The present invention relates to a system and a method for assisting an operator in operations of assembling/disassembling and/or change of configuration of an operating machine.

BACKGROUND

The term operating machine is used to generally indicate any machine arranged in any manufacturing line for automatically processing industrial products of various kinds, such as for example a packaging or wrapping machine of the tobacco industry. Further examples of operating machines are machines for the production and/or packaging of confectionery products and machines for the production and/or packaging of absorbent articles.

The term change of configuration is used to generally indicate the change of format and/or brand and/or material of the industrial product that can be processed in the operating machine. This change of format and/or brand and/or material requires an intervention on the operating machine, as discussed below.

The operating machines to which reference will be made in the present description and in the subsequent claims have a fixed part and a plurality of pieces that can be mounted/dismounted in/from the fixed part and possibly replaced. Normally, the fixed part is not subject to modifications and/or replacements of pieces in ordinary circumstances, unless there are any breakages or special maintenance interventions.

The aforementioned pieces typically comprise components of the machine which interact with the industrial product processed by the operating machine, such as for example drums, levers, pushers, etc. The characteristics of these pieces depend on the properties of the product to be processed, such as the format of the product, the materials used and the brand adopted. The possible replacement of the aforementioned pieces with other pieces having different characteristics allows changing the configuration of the operating machine adapting it to the characteristics of the product that one wishes to process each time. The operating machines can therefore operate in different configurations, and therefore process products with different characteristics, after replacing a certain quantity of pieces.

For example, in the case of packaging machines in the tobacco industry, it is possible to vary the number and size of cigarettes in a pack, with consequent variation in the format and/or shape of the pack itself.

Typically, during normal operation of the operating machine, the pieces correlated to the format and/or brand and/or material of the desired product are mounted on the fixed part. Further pieces correlated to possible different formats and/or brands and/or material of product are kept in the warehouse.

Operating machines of this type are provided with manuals that show to the operators the steps required for assembling/disassembling and/or change of configuration.

The assembly of an operating machine comprises mounting various pieces according to a predetermined sequence of operations so as to prepare the machine to operate in a desired configuration. The mounting operations are typically preceded by an operation of selecting in the warehouse the pieces to be mounted among a plurality of other pieces correlated to possible different configurations of the operating machine.

The disassembly of an operating machine comprises dismounting pieces according to a predetermined sequence of operations. The dismounting operations are typically followed by an operation of housing the dismounted pieces in suitable housing zones provided in the same warehouse that houses the pieces to be mounted.

The change of configuration of an operating machine comprises a sequence of operations of dismounting the pieces correlated to a previous configuration and of mounting pieces correlated to a desired configuration. These operations can be performed on one or more sectors of the machine by a single operator or by several operators working simultaneously.

The Applicant has noted that the operations of assembling/disassembling and/or change of configuration of the operating machines are often complicated and may require long times and the use of specialized operators.

Furthermore, the Applicant has found that operations on the operating machine are often affected by human errors which can cause a greater waste of time and resources and can create dangerous situations for the operators.

The Applicant has also found that, in cases where the aforementioned operations require the intervention of more than one operator, difficulties and inefficiencies may occur in coordinating the operations carried out by an operator with those carried out by another operator, with a consequent increase in the intervention times.

In the Applicant's opinion, the paper manuals used to guide the operations on the operating machine are often excessively long and complex and the consultation of the manuals causes a further waste of time and the risk of diverting the attention of the operators from the manual operations to be performed, increasing the risk of human errors.

Furthermore, the Applicant has noticed that pieces that are different from each other and intended to be mounted on the operating machine in different positions can often appear similar to each other. The Applicant has perceived that similar pieces can be inadvertently taken by mistake by the operators and mounted on the operating machine or placed in the warehouse in a wrong position.

In the Applicant's opinion, the search and selection in the warehouse of the pieces to be mounted on the operating machine and the transport of the same pieces from the warehouse to the operating machine or vice versa can be burdensome in terms of time and are possible sources of errors for the operators.

For these reasons, the Applicant has perceived that the provision of suitable measures to improve the arrangement and organization of the pieces to be mounted on the operating machine or of the pieces previously dismounted from the operating machine and of suitable measures to guide the operator in the various operations to be performed on the operating machine would reduce the times, costs and the possibility of human errors associated to assembling, disassembling and/or change of configuration of an operating machine.

Furthermore, the Applicant has perceived that the aforementioned measures would allow the use of less specialized operators, with consequent savings in terms of costs.

SUMMARY

The present invention therefore relates, in a first aspect thereof, to a system for assisting an operator in operations of assembling/disassembling and/or change of configuration of an operating machine, the operating machine comprising a plurality of first areas provided with respective first pieces to be dismounted from said operating machine or configured to receive respective second pieces to be mounted on said operating machine.

The system comprises:
  at least one support structure comprising a plurality of second areas provided with said second pieces or configured to receive said first pieces;
  a plurality of warning devices, each warning device being associated to a respective area of said plurality of first areas and/or of said plurality of second areas;
  a control unit operatively connected to said warning devices and configured to perform a predetermined sequence of commands correlated to at least some operations of a predetermined sequence of operations of assembling/disassembling and/or change of configuration of the operating machine.

The control unit is configured to selectively activate and deactivate said warning devices according to said sequence of commands.

In a second aspect thereof, the present invention relates to a method for assisting an operator in operations of assembling/disassembling and/or change of configuration of an operating machine, wherein said method is implemented by a control unit operatively associated to the operating machine and to at least one support structure configured to support first pieces to be dismounted from the operating machine and/or comprising second pieces to be mounted on the operating machine.

The aforementioned operating machine comprises a plurality of first areas provided with respective first pieces or configured to receive respective second pieces.

Said at least one support structure comprises a plurality of second areas provided with said second pieces or configured to receive said first pieces, wherein each of said first areas and/or said second areas comprises a respective warning device.

The aforementioned method comprises:
  performing a predetermined sequence of commands correlated to at least some operations of a predetermined sequence of operations of assembling/disassembling and/or change of configuration of the operating machine and, for said at least some operations:
  selectively activating the warning device associated to a respective area of said plurality of first areas and/or of said plurality of second areas according to said predetermined sequence of commands.

In both the aspects of the invention, the aforementioned first pieces are dismounted from the operating machine in operations of disassembling or change of format of the operating machine and are then housed in the respective second areas of the support structure, while the aforementioned second pieces are picked from the support structure and mounted later on the respective first areas of the operating machine in operations of assembling or change of format of the operating machine. In the specific case of change of format, the second pieces can be mounted on the operating machine in place of the first pieces previously dismounted.

The second areas of the support structure can both house the second pieces intended to be mounted on the operating machine and possibly receive the first pieces dismounted from the operating machine so as to allow an orderly arrangement of each piece in a defined position or vice versa.

The warning devices allow to immediately signal to the operator, depending on the case, the correct first piece to be dismounted from the operating machine, the correct area of the support structure on which to place a first piece dismounted from the operating machine, the correct second piece to be picked from the support structure to mount it on the operating machine, and the correct area of the operating machine in which to mount a respective second piece. Time saving is thus achieved, while at the same time preventing the operator from picking/dismounting wrong pieces and/or positioning/mounting pieces in wrong areas of the operating machine and/or of the support structure.

The activation/deactivation of the warning devices is managed automatically by the control unit according to a predetermined sequence of commands so as to guide the operator according to a predetermined sequence of operations.

In at least one of the aforementioned aspects, the present description can present at least one of the preferred characteristics described below, taken singularly or in combination.

Preferably, each warning device comprises a respective light source selectively actuatable.

The activation of the light source immediately signals to the operator the area from which a piece to be picked must be picked/dismounted or the area in which a piece to must be placed/mounted during the execution of an operation.

Preferably, each light source can selectively emit a particular type of signal. For example, it can emit a steady or intermittent light, possibly of a colour selected from a group of preferred colours. In this context, white is also considered a colour.

Each type of signal is indicative of a respective information correlated to a specific operation to be performed at a specific area of the operating machine and/or of the support structure, this area being the one identified each time upon the activation of the respective warning device. For example, a type of signal can be associated to a specific operator to whom that specific operation has been assigned to indicate that he must intervene at that moment to perform that specific operation. This allows the various operators operating on the same operating machine to be effectively coordinated with each other. If the operating machine is divided into various sectors dedicated to respective operators, a type of signal can be associated to a specific sector of the operating machine to indicate that that is exactly the sector in which to perform that specific operation.

Preferably, the use of a detection device operatively connected to the control unit and configured to detect a verification signal is provided.

In this case, said control unit can be configured to perform at least some of the commands of the predetermined sequence of commands only upon detection of respective verification signals.

Preferably, the control unit is configured to perform at least one command correlated to a current operation of the predetermined sequence of operations only upon detection of a respective verification signal correlated to an operation preceding the current one in the predetermined sequence of operations.

In this way the possibility of performing subsequent operations without having first completed the current operations is prevented, thus avoiding possible causes of errors in the arrangement or mounting the pieces and contributing to the maintenance of the desired orderly arrangement of the pieces on the support structure.

The control unit can therefore verify that an operation has been performed and consequently perform the command associated to a subsequent operation in the predetermined sequence of operations. It is thus possible, for example, to pick a piece from an area of the operating machine or of the support structure and, immediately before or after picking up this piece from that area, to confirm, by detecting the aforementioned verification signal, that the piece has been picked from the correct area in order to proceed with the subsequent operation. It is also possible, for example, to house a piece dismounted from the operating machine at an area of the support structure and, immediately before or after housing said piece in said area, to confirm, by detecting the aforementioned verification signal, that the piece has been placed in the correct area in order to proceed with the subsequent operation.

The execution of the command associated to this subsequent operation causes the activation of the warning device associated to the area of the operating machine or of the support structure involved in this subsequent operation.

Preferably, the use of a plurality of identification devices is provided, each identification device being associated to a respective area of said plurality of first areas and/or second areas.

The identification devices make it possible to uniquely identify the first areas of the operating machine in which the first pieces to be dismounted are mounted, or the second areas of the support structure on which the first pieces dismounted from the operating machine must be placed, or the first areas of the operating machine in which the second pieces to be mounted must be mounted, or the second areas of the support structure from which the second pieces to be mounted on the operating machine must be picked.

Preferably, each identification device comprises an identification code of said respective area or of the piece arranged in the respective area or of the piece to be housed/mounted in said respective area. This code can be, for example, a bar code (preferably a datamatrix), or an alphanumeric code or a QR code.

In a preferred embodiment, the at least one detection device comprises a portable reading device configured to read said identification code. In this case, the detection of the verification signal consists in reading said identification code. This reading can be made immediately before or after performing the requested operation at the area in which that identification code is arranged so as to send the verification signal to the control unit and therefore allow the control unit to perform the command associated to a subsequent operation in the predetermined sequence of operations.

In an alternative embodiment, the at least one detection device comprises a touch sensor associated to a respective area of the plurality of first areas and/or the plurality of second areas and configured to receive a touch input from the operator. The touch sensor can be used by the operator to manually confirm that the requested operation has been successfully performed at the respective area. This type of sensor can also be used to confirm the identity of the operator who has performed the operation.

In another embodiment, the at least one detection device comprises a proximity sensor associated to a respective area of the plurality of first areas and/or of the plurality of second areas, said proximity sensor being configured to detect the presence of a first piece and/or of a second piece in the respective area. The proximity sensor automatically communicates to the control unit that the requested operation has been successfully performed at the respective area.

In another embodiment, the at least one detection device comprises a biometric sensor configured to detect biometric data of an operator. The biometric sensor can be used to automatically communicate to the control unit both that the requested operation has been successfully performed and the identity of the operator who has performed the operation.

In another embodiment, the at least one detection device comprises an identification sensor, for example of the RFID type, configured to detect an identification signal. For example, the identification signal can be associated to (and be identifier of) a respective first or second piece and/or of a respective operator. In this way the control unit can verify if the piece used in the operation is the correct one and/or if the operator who performed the operation is the correct one.

Preferably, the use of at least one portable device operatively connected to the control unit is provided. This portable device can be a smartphone, a tablet, a palmtop computer, a laptop, a code reader, augmented or virtual reality goggles and more generally a portable terminal, meaning with portable terminal any electronic and/or optoelectronic device suitable to be gripped and/or carried by the operator.

Preferably, said at least one portable device comprises a display and is configured to display on said display a sequence of instructions correlated to said predetermined sequence of commands.

The operator can comfortably carry the portable device along with him while performing the operations and receives instructions from the portable device without having to search for them in the manual.

Preferably, the portable device comprises the detection device, which in this case is preferably the aforementioned optical code reading device. It is therefore preferable to incorporate in a single portable device both the sequence of instructions correlated to said predetermined sequence of commands, and the function of identifying the various areas provided on the support structure, so as to reduce the assembling operations of the support structure itself.

Preferably, each identification device comprises a respective warning device. It is therefore preferable to incorporate in a single device both the warning function and the function of identifying the various areas provided on the support structure, so as to reduce the assembling operations of the support structure itself.

Preferably, at least some of said identification devices comprise a respective electronic display configured to display an identification code of the respective area or of the piece arranged in the respective area or of the piece to be housed/mounted in said respective area.

In this description and in the subsequent claims, the term "electronic display" is used to indicate a display suitable for digitally displaying codes, numbers, letters, bar codes, datamatrix, QR codes, information in general or any other coding form (such as for example instructions or warnings for the operator associated to the piece arranged or to be placed in a respective area of the support structure and/or of the operating machine) and which is programmable or controllable to display different codes, numbers or information. In one embodiment, the electronic display can be configured to display simple instructions and/or videos relating to operations to be performed by the operators.

The provision of the electronic display allows to set and modify the identification codes according to the needs. For example, the same area of the support structure can be used to house different pieces in different operating steps and the electronic display allows to modify the identification code which is shown according to the piece which is housed.

In particularly preferred embodiments, at least one identification device comprises an electronic label, preferably a luminous electronic label. The electronic luminous labels comprise an electronic display and one or more light sources (LEDs) arranged at the edges of the electronic display. The electronic display defines the aforementioned identification device and the light sources define the aforementioned warning devices.

In one embodiment, at least some of said identification devices comprise a transmitter or a transponder configured to communicate the aforementioned identification code via radio. In this case the operator can read the identification code by means of a portable device which comprises a detection device configured to receive the identification code via radio.

Preferably, the control unit comprises a database and said at least one portable device is wirelessly connectable to the database. In this way the control unit can send to the portable device all the instructions to assist the operator in operations of assembling/disassembling and/or change of configuration of the operating machine and, in the case in which the portable device incorporates the detection device, he can receive from the portable device the verification signals each time it is required in order to proceed with the aforementioned operations.

The control unit can be integrated into the support structure, or integrated into the operating machine or, preferably, arranged in a remote position with respect to the support structure and to the operating machine.

The control unit preferably comprises a memory sub-unit in which the database is stored and is configured to generate and send suitable command signals to the portable device and to the warning devices based on instructions saved in said memory sub-unit.

In the case in which the aforementioned plurality of warning devices is associated to the aforementioned second areas, a control device can be installed on the support structure and can be operatively connected to the control unit and to the warning devices provided in the support structure to receive a respective first control signal from the control unit and to actuate and/or adjust each warning device selectively based on said respective first control signal.

In the case in which the aforementioned plurality of warning devices is associated, also or only, to the first areas, a control device can be installed on the operating machine and can be operatively connected to the control unit and to said warning devices to receive at the control unit a respective first control signal and to actuate and/or adjust each of said warning devices selectively based on said respective first control signal.

Preferably, the use of a plurality of support structures of the type described above is provided, each of said support structures comprising a plurality of areas configured to house respective pieces of said plurality of pieces.

Preferably, the use of a plurality of additional warning devices is also provided, each of said additional warning devices being associated to a respective support structure and connected to said control unit.

In particular, it is provided that the additional warning device is associated to a main face of the support structure.

In this case, preferably, said predetermined sequence of commands comprises a specific command correlated to an operation of moving at least one of said support structures and the control unit is configured to selectively activate and deactivate each additional warning device according to said specific command.

The plurality of support structures allows to store and manage a greater quantity of pieces and to optimize the operations of mounting/dismounting and/or change of configuration of the operating machine. This is particularly useful when working on particularly large or complex operating machines.

The support structures can be stored in a suitable storage environment. The support structures to be used to perform the operations of mounting/dismounting or change of configuration of the operating machine can be picked from the storage environment and transported close to the operating machine.

The activation of the additional warning device signals to the operator the support structure to be picked from the warehouse and transported close to the operating machine to perform the predetermined sequence of operations.

Preferably, if the support structure comprises several support surfaces, a respective additional warning device is associated to each support surface.

This additional warning device allows to signal to the operators the support surface on which to operate, for example the support surface on which one or more pieces to be mounted on the operating machine are located or the support surface intended to house one or more pieces removed from the operating machine. This is particularly advantageous when several operators operate on a single support structure.

Preferably, the control device of the support structure is operatively connected also to each additional warning device to receive also a second control signal from the control unit and to actuate and/or adjust the additional warning device based on said second control signal.

In the case in which the aforementioned plurality of identification devices is associated to the aforementioned second areas, the control device of the support structure is operatively connected also to said plurality of identification devices to receive a respective third control signal from the control unit and to set the identification devices of the support structure based on said respective third control signal.

In the case in which the aforementioned plurality of identification devices is associated, also or only, to the aforementioned first areas, the control device of the operating machine is also operatively connected to said plurality of identification devices to receive a respective third control signal from the control unit and to set the identification devices of the support structure based on said respective third control signal.

Preferably, the control device of the support structure is operatively connected also to the additional identification device provided on the support structure to receive a respective fourth control signal from the control unit and to set the additional identification device based on said respective fourth control signal.

In the embodiments in which detection devices associated to respective first and/or second areas are used, the control device of the support structure and/or of the operating machine is operatively connected to said detection devices to receive the detected signal/input from said detection devices and to transmit that signal/input to the control unit.

Preferably, in the case in which the control unit is in a remote position with respect to the support structure and/or to the operating machine, the control device of the support structure and/or of the operating machine comprises a respective wireless communication sub-unit configured for receiving radio signals from the control unit, said radio signals comprising said first control signal and/or said second control signal and/or said third control signal.

Preferably, at least some of the second areas provided on the support structure comprise respective support members configured to reversibly support respective first and/or second pieces in said support structure.

Preferably, said support structure can be moved on wheels. This measure makes it possible to easily move the support structure from the storage environment to a zone close to the operating machine or vice versa.

Preferably, the support structure comprises two support surfaces, each support surface comprising respective second areas. In this way, for example, it is possible to dedicate one support surface to the housing of the pieces dismounted from the operating machine and the other support surface to the housing of the pieces to be mounted on the operating machine.

Preferably, the two support surfaces face opposite sides, so as to maximize the capacity of the support structure to housing pieces by containing the overall dimensions of the support structure and also allowing the operator to work easily on each support surface or on both.

Preferably, the support structure comprises a frame having a rectangular plan shape with two long sides and two short sides, said support surfaces being arranged at the long sides and said main face being arranged at a short side.

In accordance with what has been described above, preferably, at least a first operation of said predetermined sequence of operations comprises picking a second piece from a respective second area to mount it on a respective first area. In this case, after having performed the command correlated to said at least one first operation, the control unit activates the warning device associated to said respective second area. This warning device signals to the operator the position on the support structure of the second area in which the second piece to be mounted on the operating machine is housed, allowing him to quickly and easily identify the aforementioned second area and avoiding that he can mistakenly pick another piece arranged in another second area or trying in vain to mount such another piece on the operating machine.

Preferably, after having activated the warning device associated to said second area, the control unit activates the warning device associated to the respective first area. In this way the position on the operating machine of the first area in which the second piece must be mounted is signalled to the operator allowing him to quickly and easily identify this first area and avoiding that he can mistakenly try to mount the second piece in another first area.

Preferably, at least one second operation of said predetermined sequence of operations comprises dismounting a first piece from a respective first area to place the first piece on a respective second area. In this case, after having performed the command correlated to said at least one second operation, the control unit activates the warning device associated to said respective first area. This warning device signals to the operator the position on the operating machine of the first area that houses the first piece to be dismounted allowing him to quickly and easily identify the aforementioned first area and avoiding that he can mistakenly dismount another piece from another first area.

Preferably, after having activated the warning device associated to said first area, the control unit activates the warning device associated to the respective second area. This allows the operator to find the aforementioned second area quickly and easily and prevents the operator from placing the piece by mistake in another second area, with consequent subsequent problems in tracing the piece.

In accordance with what has been described above, preferably, after having activated the warning device associated to said respective area, the control unit verifies that the respective operation has been actually performed and performs the following command in the predetermined sequence of commands only if such a verification has been successful.

Preferably, after having verified that the respective operation has been actually performed and before performing said following command, the control unit deactivates said warning device. In this way, the warning devices are switched off after the requested operation has been completed and do not overlap to other warning devices switched on during different operations, creating confusion.

In accordance with what has been described above, preferably, the aforementioned verification comprises reading an identification code associated to said respective area, sending the read identification code to the control unit and the comparison by the control unit of the identification code read with a predetermined identification code of the piece arranged in said respective area or of the piece to be housed in said respective area.

Preferably, the control unit performs said following command only if the read identification code matches with the predetermined code.

Preferably, the aforementioned verification is performed by said portable device.

Preferably, the predetermined code is saved in the database of the control unit.

Preferably, the control unit displays on the display of the portable device a sequence of instructions correlated to said sequence of operations, according to the predetermined sequence of commands.

Preferably, after having verified that the respective operation has been actually performed, the control unit deactivates one or more warning devices activated during the respective operation, deactivates the display of instructions regarding the respective operation from the display of the portable device, activates a warning device correlated to a subsequent operation according to the predetermined sequence of commands and displays instructions regarding a subsequent operation on the display of the portable device according to the predetermined sequence of commands.

In accordance with what has been described above, preferably, the selective activation of the warning device comprises the activation of a light source of the warning device.

Preferably, in the case in which the control unit is operatively connected to a plurality of support structures of the type described above, each of which comprising a respective additional warning device connected to said control unit, the control unit at first performs a specific command correlated to an operation of selecting one of said support structures and selectively activates the additional warning device associated to said support structure according to said specific command.

Preferably, in the case in which the control unit is operatively connected to at least one support structure provided with a plurality of support surfaces, the control unit at first performs a specific command correlated to an operation of selecting one of said surfaces support and selectively activates the additional warning device associated to said support surface according to said specific command.

BRIEF DESCRIPTION OF THE DRAWINGS

Further characteristics and advantages of the present description will become clearer from the following detailed description of preferred embodiments thereof, made with reference to the attached drawings and provided by way of indicative and non-limiting example, in which.

DETAILED DESCRIPTION

An embodiment of a system for assisting an operator in operations of assembling/disassembling and/or change of configuration of an operating machine is indicated in the attached figures with the numerical reference 1 and is referred to below with the abbreviated notation "system 1".

The operating machine is indicated with the numerical reference 100.

The operations of assembling/disassembling and/or change of configuration comprise mounting/dismounting a plurality of pieces 110 on/from the operating machine 100. For the purposes of the present description, the plurality of pieces 110 is divided into first pieces 111 and second pieces 112. The first pieces 111 are mounted in respective first areas 120 of the operating machine 100. The first pieces 111 can be dismounted from the operating machine 100 in operations of dismounting or change of configuration thereof. The second pieces 112 are not mounted on the operating machine 100 and can be mounted in respective first areas 120 of the operating machine 100 in operations of mounting or change of configuration thereof.

In the operations of change of configuration, a plurality of first pieces 111 is dismounted from the operating machine 100 and a plurality of second pieces 112 having a different format with respect to the first pieces 111 is mounted on the operating machine 100 in place of the latter.

Figure 2:
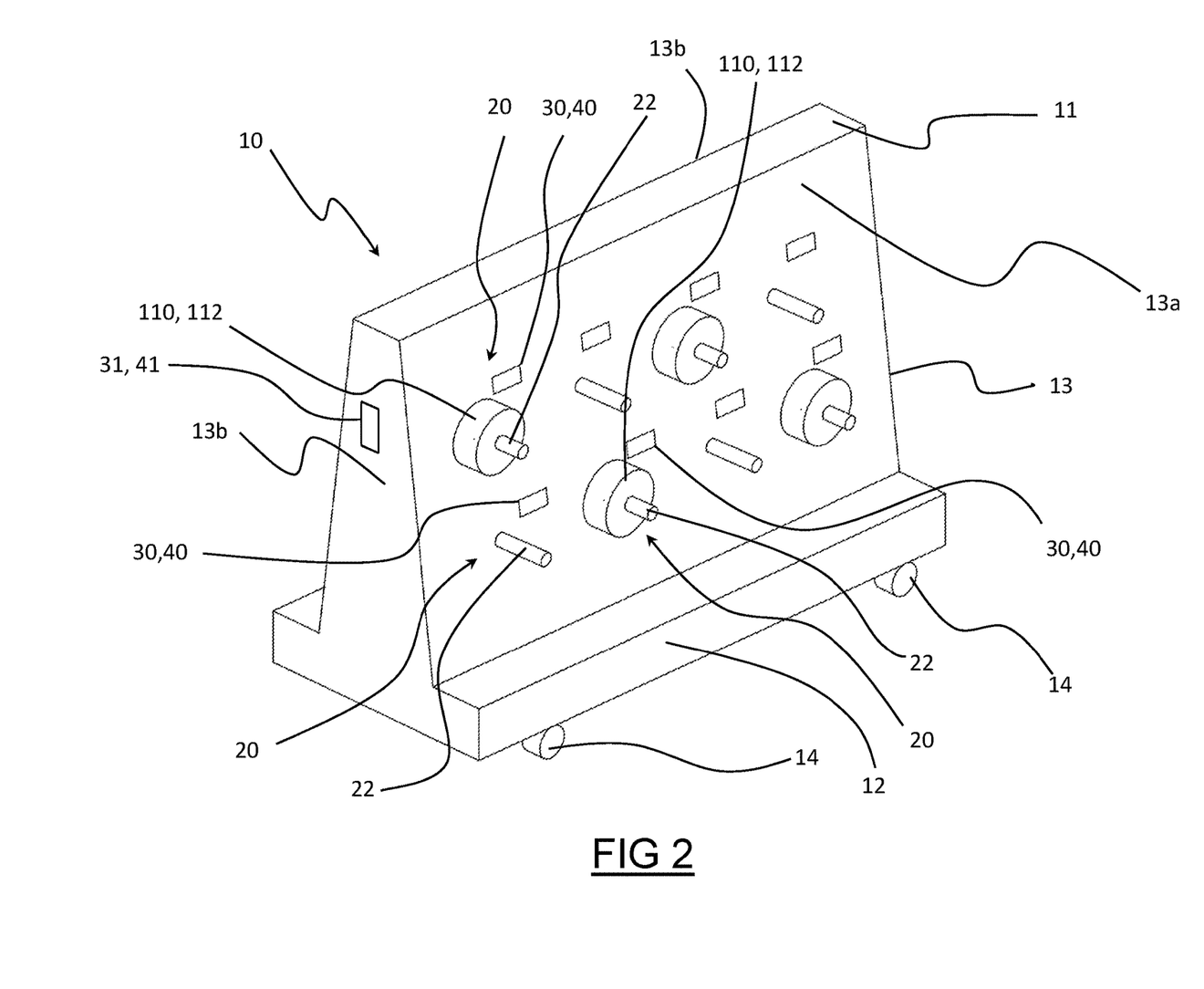
FIG. 2 shows a simplified perspective view of a component of the system of FIG. 1.

In order to assist the operator in the aforementioned operations of assembling/disassembling and/or change of configuration, the system 1 comprises a support structure 10, shown in FIG. 2, which can be used to house the second pieces 112 to be mounted on the operating machine 100 and/or the first pieces 111 dismounted from the operating machine 100.

The support structure 10 can be positioned in a storage environment, for example a warehouse, together with a plurality of similar support structures 10. The support structure 10 can also be used to transport the pieces 110 from the storage environment to a working environment close to the operating machine 100 and to transport the pieces 110 from the working environment to the storage environment.

In the working environment, the support structure 10 is arranged at a distance from the operating machine 100 and from any obstacles present in the working environment sufficiently to allow one or more operators to pick second pieces 112 from the support structure 10 to mount them on the operating machine 100 and/or to dismount first pieces 111 of the operating machine 100 to place them on or in the support structure 10.

In the embodiment shown in FIG. 2, the support structure 10 comprises a frame 11 having a base 12 and a main portion 13.

The base 12 has a rectangular shape and comprises two long sides and two short sides.

The main portion 13 comprises, at the two long sides of the base 12, two support surfaces 13a facing opposite sides and at the two short sides of the base 12, two faces facing opposite sides.

FIG. 2 shows a main face 13b of the aforementioned two faces.

The main face 13b is intended to be arranged so as to be visible to the operators when the structure 10 is placed side by side with a plurality of similar structures 10 according to an ordered arrangement.

The two support surfaces 13a, the main face 13b and the face opposite the latter all have a substantially trapezoidal shape.

Furthermore, the support structure 10 comprises a plurality of wheels 14 connected to the base 12 so as to allow the movement of the support structure 10 on a paved surface. The wheels 14 can be free, in this case the support structure 10 has the shape of a trolley and can be moved manually by the workers, for example by pushing or by means of suitable gripping members or handles (not shown).

Alternatively, a motor (not shown) can be provided which drives the wheels 14 for a motorised movement of the support structure 10.

In other embodiments not shown, the support structure 10 may not be provided with wheels 14 and can be moved manually by an operator, for example after manually lifting the support structure 10. In these embodiments, the support structure 10 can have the shape of a shelving or a crate or a box or a case and is suitable for applications in which the number and size and weight of the pieces 110 to be supported and transported is sufficiently small to allow manual handling. For this purpose, one or more lifting members can be provided which can be used by the operators to manually lift the support structure 10 in order to transport it.

The support structure 10 has a plurality of second areas 20 arranged on at least one of the support surfaces 13a and configured to house respective pieces 110, so that an operator can place a first piece 111 dismounted from a first area 120 from the operating machine 100 on or in a respective second free area 20 or he can pick a second piece 112 from a second area 20 which houses it to mount it in a first area 120 of the operating machine 100.

Some of the second areas 20 can have a support member 22, configured to support and optionally reversibly fix a piece 110 in the respective second area 20 in a defined position. Each support member 22 can be specific or it can be suitable for reversibly fixing a plurality of pieces 110 that are different from each other. In the embodiment of FIG. 2, each support member comprises a shaft bound to the frame and configured to be fitted into a hole of a respective piece 110, such as for example a drum.

In some embodiments not shown, the support structure 10 can have, at at least some second areas 20, recessed seats or support planes configured to house or support respective pieces 110, whatever their shape.

In the embodiment of FIG. 2, in order to allow a stable housing of the pieces 110 on the support surfaces 13a and to facilitate the picking/housing of the pieces 110 in the second areas 22 by the operator, the support surfaces 14 have an angle comprised between 1° and 30° with respect to a vertical plane.

The second areas 22 can be defined on each of the two support surfaces 14. In this case, one of the two support surfaces 13a can comprise areas 22 which house the pieces 112 to be mounted on the operating machine 100 while the other of the two support surfaces 13b can comprise areas 22 intended to house pieces 111 dismounted from the operating machine 100.

Some of the pieces 100 housed on the support surface(s) 13b, or on other zones of the support structure 10, may be tools intended to be used by the operator for mounting pieces 112 on the operating machine or for dismounting pieces 111 from the operating machine.

Figure 1:
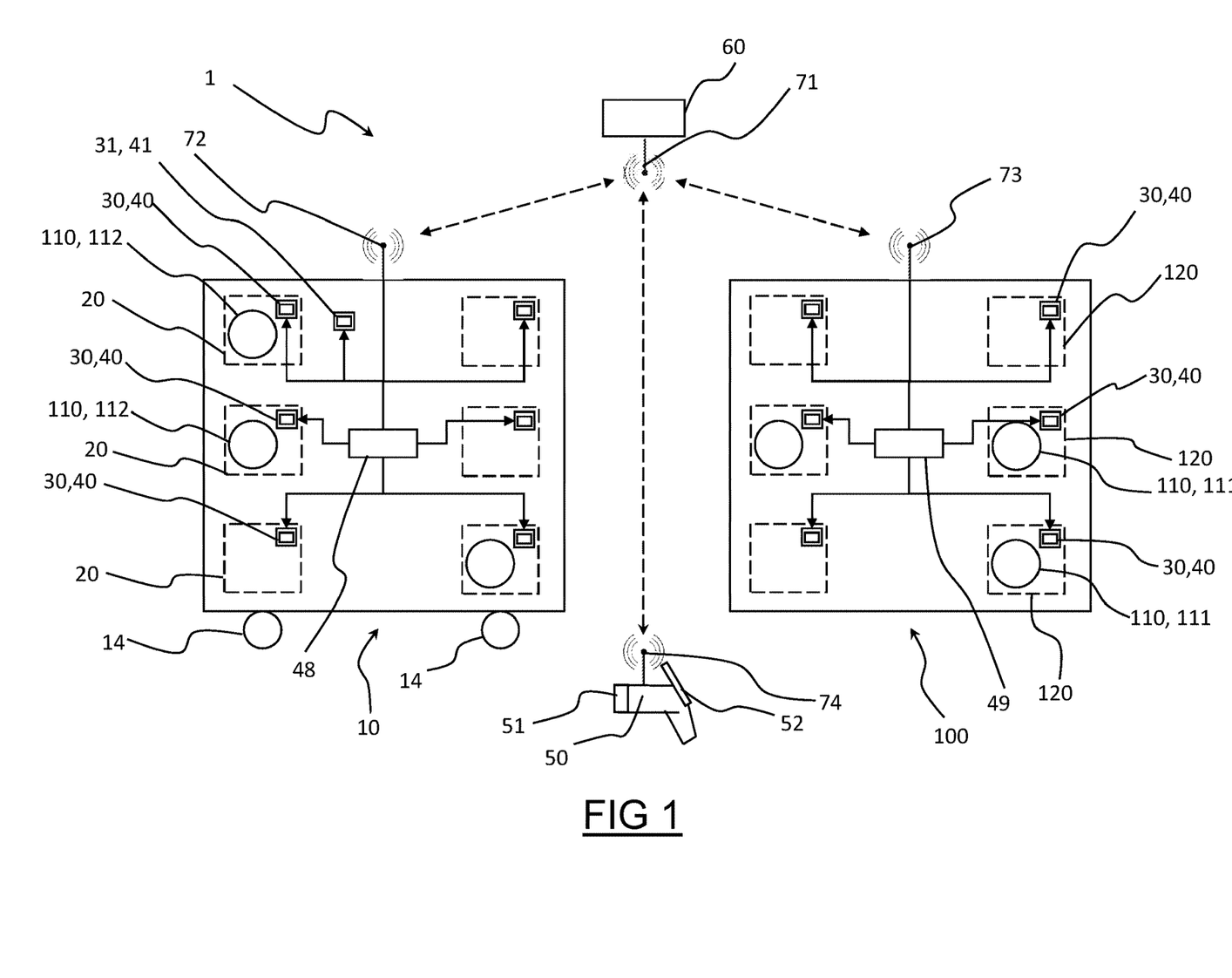
FIG. 1 shows a schematic view of an operating configuration of a system for assisting an operator in operations of assembling/disassembling and/or change of configuration of an operating machine in accordance with the present invention.

The system 1 further comprises a plurality of warning devices 30 which can be associated to a respective area of the plurality of first areas 120 and/or of the plurality of second areas 20.

In the embodiment of FIG. 1, some of the warning devices 30 are associated to first areas 120 of the operating machine 100, each installed on the operating machine 100 close to, or at, a respective first area 120.

Furthermore, in the embodiment of FIG. 1, other warning devices 30 are associated to second areas 20 of the support structure 10, each installed on the support structure 10 close to, or at, a respective second area 20.

In possible embodiments not shown, the plurality of warning devices 30 is associated only to respective first areas 120 (and therefore is installed only on the operating machine 100) or, alternatively, only to respective second areas 20 (and therefore is installed only on the support structure 10).

Each warning device 30 is configured to emit a signal perceivable by an operator. Preferably, this signal is a light signal.

In an alternative embodiment not shown, the signal is of the acoustic type.

In preferred embodiments, each warning device 30 comprises at least one light source 30a, for example one or more LEDs. The light source 30a can be configured to emit a steady or intermittent light, or to selectively emit a steady and intermittent light. Furthermore, the light source 30a can be configured to emit light of a specific colour or light of a colour selectively selected from a preferred group of colours.

The warning devices 30 are positioned close to or at the respective first areas 120 or second areas 20 in such a way as to be exposed and visible to the operators. The characteristics and intensity of the light emission of the warning devices 30 are configured to capture the attention of the operator or operators during the operations to be performed on the operating machine 100 to guide them during these operations.

The system 1 further comprises a plurality of identification devices 40 associated to respective first areas 120 and/or second areas 20.

In the embodiment of FIG. 1, some of the identification devices 40 are associated to first areas 120 of the operating machine 100, each installed on the operating machine 100 close to, or at, a respective first area 120.

Furthermore, in the embodiment of FIG. 1, other identification devices 40 are associated to second areas 20 of the support structure 10, each installed on the support structure 10 close to, or at, a respective second area 20.

In possible embodiments not shown, the plurality of identification devices 40 is associated only to respective first areas 120 (and therefore is installed only on the operating machine 100) or, alternatively, only to respective second areas 20 (and therefore is installed only on the support structure 10).

In the system of FIG. 1, each identification device 40 comprises an electronic display 45 configured to display an identification code 46, for example a bar code (preferably a data-matrix), an alphanumeric code or a QR code. The identification code 46 can be modified and uniquely identifies the respective first area 120 or second area 20, or the piece 110 housed/mounted in the respective first area 120 or second area 20.

Figure 3:
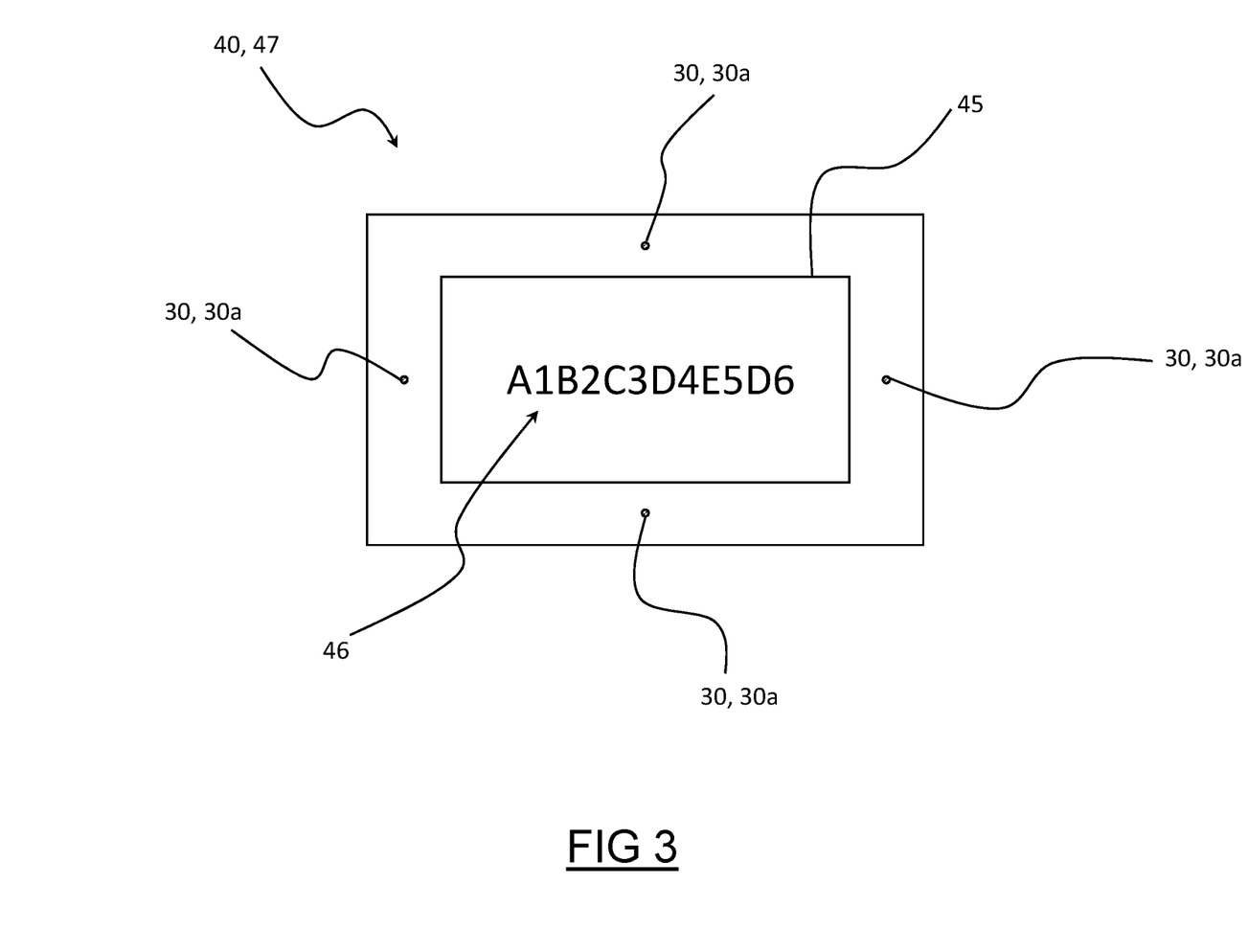
FIG. 3 shows a schematic view of an enlarged detail of the system of FIG. 1.

In the embodiment shown herein, each identification device 40 is an electronic tag 47, schematically shown in FIG. 3. The electronic tag 47 incorporates the warning device 30 associated to the same first area 120 or second area 20 to which it is associated.

Preferably, the electronic tag 47 comprises the electronic display 45 described above and a plurality of LEDs 30a arranged around the electronic display 45, which constitute the aforementioned warning device 30.

In a first alternative embodiment not shown, the identification device 40 comprises a tag or label on which the identification code 46 is printed.

In a second alternative embodiment, the identification device 40 comprises a transmitter device, for example of the NFC (Near Field Communication) type or a transponder, for example of the RFID (Radio Frequency Identification) type, configured to emit the respective identification code 46 via radio or magnetically.

The system 1 can comprise a plurality of support structures similar to the support structure 10 described above.

Each of these support structures 10 comprises an additional warning device 31 and, preferably, an additional identification device 41, similar to those described above. The additional warning device 31 and the additional identification device 41 are arranged on the respective main face 13b, as shown in FIG. 2. Such additional warning 31 and identification 41 devices are used to allow spotting and identifying the support structure 10 by an operator.

The, or each, support structure 10 can also comprise an additional warning device 31 and an additional identification device 41 associated to each support surface 13a.

With reference to FIG. 1, the system 1 comprises at least one portable device 50, which can be transported and used by an operator during operations of assembling/disassembling and/or change of configuration of the operating machine 100. In particular, the number of portable devices 50 is at least equal to the number of operators who are expected to operate, simultaneously or not, on the operating machine 100.

Each portable device 50 comprises a detection device 51 configured to detect a verification signal. The verification signal confirms that an operation has been performed on the operating machine 100 or on the support structure 10 and contains information that the operation has been successfully performed and, preferably, how to perform the operation.

Preferably, the detection device 51 comprises a portable reading device configured to read the identification code 46 displayed by the identification devices 40. This reading device can be used by an operator immediately before or after performing an operation of reading the identification code 46 associated to the first area 120 or second area 20 on which he has operated or must operate.

Each portable device 50 further comprises a display 52 configured to display one or more instructions suitable for assisting the operator during the operations of assembling/disassembling and/or change of configuration of the operating machine 100.

In alternative embodiments not shown, the system 1 can comprise one or more additional/alternative detection devices to the one described above. For example, a plurality of such additional/alternative detection devices can be provided, each associated to a respective first area 120 or second area 20 and installed respectively on the operating machine 100 or on the support structure 10.

Each of the aforementioned additional/alternative detection devices may comprise a touch sensor configured to receive a touch input. This touch sensor can be used by the operator to manually confirm that the operation has been successfully performed on the respective first area 120 or second area 20 and generate a verification signal containing this information.

Alternatively, or in combination with the detection devices described above, each of the aforementioned additional/alternative detection devices can comprise a proximity sensor configured to automatically detect the presence of a piece 110 in the respective first area 120 or second area 20 and to generate a verification signal when the piece 110 is housed/mounted in the respective first area 120 or second area 20 or picked/dismounted from the respective first area 120 or second area 20.

Alternatively, or in combination with the detection devices described above, each of the aforementioned additional/alternative detection devices can comprise a biometric sensor configured to detect biometric data of an operator. The biometric sensor can be used to generate a verification signal regarding the identity of an operator and that an operation has been successfully performed by the operator.

Alternatively, or in combination with the detection devices described above, each of the aforementioned additional/alternative detection devices can comprise an identification sensor, for example of the RFID type, configured to detect an identification signal. For example, the identification signal can be associated to (and can be identifier of) a respective piece 110 and can be used to generate a verification signal regarding the identity of the piece 110 arranged in a respective first area 120 or second area 20. Or, the identification signal can be associated to a respective operator, for example by means of a magnetic card, which can be read by the identification sensor to generate a verification signal regarding the identity of the operator and that an operation has been successfully performed by the operator.

As shown in FIG. 1, in one of the preferred embodiments thereof the system 1 comprises a control device 48 installed on the support structure 10. The control device 48 is connected to the warning devices 30 of the support structure 10 and is configured to activate them selectively based on a first control signal. Furthermore, the control device 48 can be connected to each additional warning device 31 of the support structure 10 and configured to activate it selectively based on a second control signal.

In the embodiment in which the identification devices 40 of the support structure 10 comprise a respective electronic display 45, the control device 48 can be connected to this electronic display 45 to set the identification code 46 displayed based on a third control signal.

If the aforementioned additional identification device 41 is provided and said additional identification device 41 comprises a respective electronic display 45, the control device 48 can be connected to this electronic display 45 to set the identification code 46 displayed based on a fourth control signal.

The control device 48 is also configured to receive from the detection device(s) 51 of the support structure 10 the signal or input detected therefrom.

Similarly, and as shown in FIG. 1, a control device 49 can be installed on the operating machine 100 and be connected to the warning devices 30 of the operating machine 100 to activate them selectively based on a first control signal.

In the embodiment in which the identification devices 40 of the operating machine 100 comprise an electronic display 45, the control device 49 can be connected to the electronic display 45 to set the identification code 46 displayed based on a third control signal.

In the embodiment in which a plurality of detection devices 51 are installed on the operating machine 100, the control device 49 of the operating machine 100 is configured to receive from the detection devices 51 of the operating machine 100 the signal or input detected therefrom.

The system 1 further comprises a control unit 60. In the preferred embodiment of FIG. 1, the control unit 60 is integrated into a desktop or portable computer or PC arranged in a remote position with respect to the support structure 10, the portable device 50 and the operating machine 100.

In alternative embodiments, the control unit 60 can be integrated into the operating machine 100, into the support structure 10 or into the portable device 50.

The control unit 60 comprises a processor and a memory sub-unit. A predetermined sequence of commands correlated to at least some operations of a predetermined sequence of operations of assembling/disassembling and/or change of configuration of the operating machine 100 is stored in the memory sub-unit. In particular, each of these commands is correlated to a specific operation of the sequence of operations. The control unit 60 is therefore configured to perform the commands in parallel with the execution of the operations, so that each command is performed immediately before, during or immediately after a respective operation.

In the embodiment described and shown herein, the aforementioned sequence of commands comprises commands aimed at activating and deactivating respective warning devices 30 and, if provided, the additional warning device(s) 31.

The sequence of commands further comprises commands aimed at displaying the identification code 46 or simple instructions on the electronic displays 45 of the identification devices 40 and, if provided, on the electronic display(s) 45 of the additional identification device(s) 41.

Furthermore, the sequence of commands comprises commands aimed at displaying on the display 52 of the portable device 50 instructions correlated to the operations of assembling/disassembling and/or change of configuration of the operating machine 100. These instructions may be presented in the form of text and/or images and/or videos.

A database is saved in the memory sub-unit, the database comprising predetermined codes assigned or assignable to the pieces 110 to be handled in the operations of assembling/disassembling and/or change of configuration of the operating machine 100. The database also comprises the aforementioned instructions.

The control unit 60 is therefore operatively connected to the warning devices 30, to the identification devices 40 and to the portable device(s) 50.

In the embodiments not shown which comprise the aforementioned additional/alternative detection devices, these additional/alternative detection devices are also operatively connected to the control unit 60.

In the preferred embodiment, shown in FIG. 1, the connection between the control unit 60 and the aforementioned devices 30, 40, 50 and any additional/alternative detection devices is made wirelessly.

To this end, the control unit 60 comprises a respective wireless communication sub-unit 71 configured to transmit and/or receive wireless signals.

The support structure 10 comprises a respective wireless communication sub-unit 72 connected to the respective control device 48 or integrated therein. The wireless communication sub-unit 72 is configured to receive the control signals mentioned above with reference to the support structure 10 via radio from the wireless communication sub-unit 71 of the control unit 60. Furthermore, the wireless communication sub-unit 72 can be configured to transmit signals or inputs detected by any additional/alternative detection devices of the type described above via radio to the wireless communication sub-unit 71 of the control unit 60.

Similarly, the system 1 comprises a respective wireless communication sub-unit 73 connected to the respective control device 49 of the operating machine 100 or integrated therein. The wireless communication sub-unit 73 is configured to receive the control signals mentioned above with reference to the operating machine 100 via radio from the wireless communication sub-unit 71 of the control unit 60. Furthermore, the wireless communication sub-unit 73 can be configured to transmit signals or inputs detected by any additional/alternative detection devices of the type described above via radio to the wireless communication sub-unit 71 of the control unit 60.

Similarly, the portable device 50 comprises a respective wireless communication sub-unit 74 connected to the detection device 51 and to the display 52. The wireless communication sub-unit 74 is configured to transmit the signals detected by the detection device 51 via radio to the wireless communication sub-unit 71 of the control unit 60. Furthermore, the wireless communication sub-unit 74 is configured to receive respective instructions to be displayed on the display 52 via radio from the wireless communication sub-unit 71 of the control unit 60.

In alternative embodiments not shown, the wireless connection between the control unit 60 and the control device 49 of the operating machine 100 can be replaced by a physical connection by means of one or more electrical conductors.

In further embodiments not shown, the warning devices 30 and/or the identification devices 40, and/or the additional warning devices 31 and/or the additional identification devices 41 integrate respective transmitters/receivers configured to transmit and/or receive wireless signals to/from the wireless communication sub-unit 71 of the control unit 60.

The control unit 60 is configured to implement a method for assisting an operator in operations of assembling/disassembling and/or change of configuration of the operating machine 100.

This method can be implemented through the system 1 described above and comprises performing, by the control unit 60, a predetermined sequence of commands stored in the memory sub-unit of the control unit 60. Each of these commands relates to a specific operation of a predetermined sequence of operations to be performed for assembling/disassembling and/or change of configuration of the operating machine 100.

The aforementioned commands are performed in parallel with the execution of the aforementioned operations, so that each command is performed immediately before, during or immediately after a respective operation.

One of the aforementioned operations can provide for an operator to pick a second piece 112 from a respective second area 20 of the support structure 10 and to mount the second piece 112 in a respective first area 120 of the operating machine 100.

Another of the aforementioned operations can provide for an operator to dismount a first piece 111 from a respective first area 120 of the operating machine 100 and to place the first piece 111 in a respective second area 20 of the support structure 10.

If a plurality of support structures 10 is provided, another of the aforementioned operations can comprise picking from a warehouse the support structure 10 in which the second pieces 112 to be mounted on the operating machine 100 are arranged and/or in which the first pieces 111 dismounted from the operating machine 100 must be arranged.

The activities of assistance carried out in the event that a change of format of the operating machine 100 is to be performed are described below.

The change of format comprises dismounting first pieces 111 from first areas 120 of the operating machine 100, housing these first pieces 111 in respective second areas 20 of the support structure 10, picking second pieces 112 from other second areas 20 of the support structure 10 and mounting said second pieces 112 in the aforementioned first areas 120.

Obviously, what is described below finds analogous application in the case in which it is simply necessary to perform an assembly of the operating machine 100 (in which case only the picking of second pieces 112 from second areas 20 of the support structure 10 and the subsequent mounting of such second pieces 112 in respective first areas 120 of the operating machine are provided) or a disassembly of the operating machine 100 (in which case only the dismounting of first pieces 111 from first areas 120 of the operating machine 100 and the subsequent housing of said first pieces 111 in respective second areas 20 of the support structure 10 are provided).

The control unit 60 performs a command which causes the selective activation of the warning device 30 associated to the first area 120 of the operating machine 100 in which the first piece 111 to be dismounted is mounted.

The control unit 60 can also perform a command which causes the indication on the display 52 of the portable device 50 of the aforementioned first area 120 and of any additional instructions to be followed for dismounting the first piece 111 from the first area 120.

The operator then proceeds to dismount the first piece 111 from the first area 120. Immediately before or after such dismounting, the operator reads the identification code 46 arranged in the first area 120, sending a specific verification signal to the control unit 60.

The control unit 60 now compares the identification code 46 with a predetermined code stored in its database and identifying the first piece 111 dismounted from the first area 120 of the operating machine 100. The verification is successful if the read identification code 46 matches with the predetermined code.

If the aforementioned verification is successful, the control unit 60 performs a command which causes the deactivation of the warning device 30 associated to the first area 120 and the selective activation of the warning device 30 associated to the second area 20 of the support structure 10 in which the first piece 111 must be housed.

The control unit 60 can also perform a command which causes the indication on the display 52 of the portable device 50 of the aforementioned second area 20 and of any additional instructions to be followed for housing the first piece 111 in the second area 20.

The operator then proceeds to house the first piece 111 in the aforementioned second area 20. Immediately before or after this action, the operator reads the identification code 46 arranged in the second area 20, sending a specific verification signal to the control unit 60.

The control unit 60 now compares the identification code 46 just read with a predetermined code stored in its database and identifying the second area 20. The verification is successful if the read identification code 46 matches with the predetermined code.

If the aforementioned verification is successful, the control unit 60 perform a command which causes the deactivation of the warning device 30 associated to the second area 20 and the selective activation of the warning device 30 associated to a different second area 20 of the structure support 10 from which to pick the second piece 112 which is to be mounted in the first area 110 of the operating machine in place of the first piece 111.

At this point the method proceeds in the same way as described above.

If one of the aforementioned verifications fails, the control unit does not perform the following commands and, preferably, displays an error message on the display 52 of the portable device 50.

In the case in which various support structures 10 of the type described above are provided, before performing the commands described above, the control unit 60 performs a command which causes the selective activation of an additional warning device 31 associated to the support structure 10 in which the first pieces 111 to be dismounted from the operating machine 100 must be housed and/or from which the second pieces 112 to be mounted on the operating machine 100 must be picked. The operator thus identifies the support structure 10 to be picked up in order to proceed with the activities described above and reads the identification code 46 arranged on this support structure 10, sending a specific verification signal to the control unit 60.

In the case in which various support surfaces 13a are provided on the, or on each, support structure 10, before performing the commands described above, the control unit 60 performs a command which causes the selective activation of an additional warning device 31 associated to the support surface 13a in which the first pieces 111 to be dismounted from the operating machine 100 must be housed and/or from which the second pieces 112 to be mounted on the operating machine 100 must be picked. The operator thus identifies the support surface 13a on which to perform the aforementioned operations and preferably reads the identification code 46 arranged on this support surface 13a, sending a suitable verification signal to the control unit 60.

The control unit 60 now compares the identification code 46 just read with a predetermined code stored in its database and identifying the support structure 10 or the support surface 13a which houses or on which the pieces to be manipulated in the subsequent operation of change of format of the operating machine 10 must be placed. The verification is successful if the read identification code 46 matches with the predetermined code.

If this verification is successful, the method proceeds as described above.

Obviously, a person skilled in the art, in order to satisfy specific and contingent needs, can make numerous modifications and changes to the invention described above while remaining within the scope of protection defined by the following claims.

The invention claimed is:

1. A system for assisting an operator in a predetermined sequence of operations on an operating machine of an industrial production line, the system comprising:
   at least one support structure movable by an operator for transporting pieces from a storage environment to a working environment close to the operating machine and for transporting pieces from the working environment to the storage environment, the support structure comprising a plurality of support structure areas each configured to support at least one respective piece of said pieces of said operating machine;
   a plurality of warning devices installed on said support structure and each being placed next to a respective support structure area of said plurality of support structure areas so as to be associated to said respective support structure area; and
   a control unit operatively connected to said warning devices
   and configured to selectively activate and deactivate said warning devices according to a predetermined sequence of commands to assist the operator in changing configuration of said operating machine, wherein said control unit executes:
   a first plurality of commands of said predetermined sequence of commands to cause the activation of at least one warning device of said plurality of warning devices while keeping other warning devices of said plurality of warning devices deactivated, said at least one warning device being associated to said respective support structure area of said plurality support structure areas in which pieces dismounted from said operating machine are to be placed on said support structure by the operator; and
   a second plurality of commands of said predetermined sequence of commands to cause the activation of at least one warning device of said plurality of warning devices while keeping other warning devices of said plurality of warning devices deactivated, said at least one warning device being associated to the respective support structure area of the plurality of support structure areas from which pieces to be mounted on said operating machines are to be picked from said support structure by the operator.

2. The system according to claim 1, wherein each warning device is configured to emit a warning signal perceivable by said operator and being selectively actuatable to emit said warning signal as at least one of a light signal or an acoustic signal.

3. The system according to claim 1, further comprising:
   at least one detection device operatively connected to the control unit and configured to detect a verification signal, said control unit being configured to execute at least some of the commands of the predetermined sequence of commands only upon detection of respective verification signals.

4. The system according to claim 3, further comprising:
   a plurality of identification devices, each identification device being associated to a respective support structure area of said plurality of support structure areas and comprising an identification code of at least one of:
   the respective support structure area;
   said at least one respective piece of said pieces provided in the respective support structure area for mounting on said operating machine; or
   said at least one respective piece of said pieces to be received in said respective support structure area after being dismounted from said operating machine;
   wherein said at least one detection device is an identification code reading device.

5. The system according to claim 1, comprising at least one portable device operatively connected to the control unit, wherein said at least one portable device comprises a display and is configured to display on said display a sequence of instructions correlated to said predetermined sequence of commands.

6. The system according to claim 1, further comprising a plurality of first warning devices installed on said operating machine and each being placed next to a respective first area of a plurality of first areas on said operating machine so as to be associated to said respective first area.

7. The system according to claim 6, wherein said control unit further executes:
a third plurality of commands of said predetermined sequence of commands to cause the activation of at least one first warning device of said plurality of warning devices while keeping other warning devices of said plurality of warning devices deactivated, said at least one first warning device being associated to said respective first area of said plurality first areas from which at least one piece of said pieces of said operating machines are to be dismounted from said operating machine by the operator.

8. The system according to claim 6, wherein said control unit further executes:
a fourth plurality of commands of said predetermined sequence of commands to cause the activation of at least one first warning device of said plurality of warning devices while keeping other warning devices of said plurality of warning devices deactivated, said at least one first warning device being associated to respective first area of said plurality of first areas on which at least one piece of said pieces is to be mounted on said operating machine by the operator.

9. A method for assisting an operator in a predetermined sequence of operations on an operating machine of an industrial production line, wherein said method is implemented by a control unit operatively associated to the operating machine and to at least one support structure movable by an operator for transporting pieces from a storage environment to a working environment close to the operating machine and for transporting pieces from the working environment to the storage environment, the support structure comprising a plurality of support structure areas each configured to support at least one respective piece of the pieces of the operating machine, said method comprising:
providing a plurality of warning devices installed on said support structure and each being placed next to a respective support structure area of said plurality of support structure areas so as to be associated to said respective support structure area of said plurality of support structure areas;
executing, by said control unit, a predetermined sequence of commands correlated to at least some operations of said predetermined sequence of operations and, for said at least some operations:
selectively activating at least one warning device of said plurality of warning devices according to said predetermined sequence of commands to guide the operator through said predetermined sequence of operations to change a configuration of said operating machine, wherein:
executing, by said control unit, a first plurality of commands of said predetermined sequence of commands to cause the activation of the at least one warning device of said plurality of warning devices while keeping other warning devices of said plurality of warning devices deactivated, said at least one warning device being associated to said respective support structure area of said plurality support structure areas in which pieces dismounted from said operating machine are to be placed on said support structure by the operator; and
executing, by said control unit, a second plurality of commands of said predetermined sequence of commands to cause the activation of at least one warning device of said plurality of warning devices while keeping other warning devices of said plurality of warning devices deactivated, said at least one warning device being associated to the respective support structure area of the plurality of support structure areas from which pieces to be mounted on said operating machines are to be picked from said support structure by the operator.

10. The method according to claim 9, wherein:
said plurality of support structure areas are provided with respective pieces to be mounted on said operating machine and said operating machine includes a plurality of first areas on said operating machine configured to receive said respective pieces to be mounted; and
at least one first operation of said predetermined sequence of operations comprises picking at least one piece of said respective pieces to be mounted from a respective support structure area of said plurality of support structure areas to mount the at least one piece on a respective first area of said plurality of first areas;
executing, by said control unit, said predetermined sequence of commands comprises executing at least one command correlated to said at least one first operation; and
selectively activating a warning device of said plurality of warning devices accordingly comprises, after executing said at least one command, activating a warning device associated to said respective support structure area.

11. The method according to claim 9, wherein:
a plurality of first areas on said operating machine are provided with respective first pieces to be dismounted from said operating machine and said plurality of support structure areas are configured to receive said first pieces; and
at least one second operation of said predetermined sequence of operations comprises dismounting a first piece of said respective first pieces from a respective first area of said plurality of first areas to place the first piece on a respective support structure area of said plurality of support structure areas;
executing said predetermined sequence of commands comprises executing at least one command correlated to said at least one second operation; and
selectively activating a warning device of said plurality of warning devices accordingly comprises, after executing said at least one command, activating a warning device associated to said respective support structure area.

12. The method according to claim 9, comprising, after selectively actuating a warning device:
verifying that a respective operation of said predetermined sequence of operations has been performed;
wherein executing a predetermined sequence of commands comprises executing a following command only if said respective operation is verified to have been performed.

13. The method according to claim 12, comprising, after verifying that a respective operation of said predetermined sequence of operations has been performed and before executing said following command:
deactivating said warning device.

14. The method according to claim 12, wherein verifying that a respective operation of said predetermined sequence of operations has been performed comprises:
- reading an identification code associated to a respective first area of a plurality of first areas on said operating machine;
- sending the read identification code to the control unit; and
- comparing the read identification code with a predetermined code which identifies the at least one respective piece of said pieces to be arranged in said respective first area;
- wherein said respective operation is verified to have been performed only if the read identification code matches with the predetermined code.

15. The method according to claim 9, wherein executing said predetermined sequence of commands comprises displaying on a display of a portable device operatively connected to the control unit a sequence of instructions correlated to said predetermined sequence of operations.

16. The method according to claim 9, wherein:
- said control unit is operatively connected to a plurality of support structures, each of said support structures comprising a respective additional warning device operatively connected to said control unit,
- executing the predetermined sequence of commands comprises, before activating a warning device associated to a respective first area of a plurality of first areas on said operating machine, or to a respective support structure area of said plurality of support structure areas,
- executing a specific command correlated to an operation of selecting a specific support structure of said plurality of support structures;

the method further comprising:
- selectively activating the additional warning device associated to said specific support structure according to said specific command.

17. The method according to claim 10, wherein the method comprises, after activating the warning device associated to said respective support structure area, activating a warning device associated to the respective first area.

18. The method according to claim 11, wherein the method comprises, after activating the warning device associated to said respective first area, activating the warning device associated to the respective support structure area.

19. The method according to claim 12, wherein verifying that a respective operation of said predetermined sequence of operations has been performed comprises:
- reading an identification code associated to said respective support structure area;
- sending the read identification code to the control unit; and
- comparing the read identification code with a predetermined code which identifies the at least one respective piece of said pieces of the operating machine to be received in said respective support structure area;
- wherein said respective operation is verified to have been performed only if the read identification code matches with the predetermined code.

20. A system for assisting an operator in a predetermined sequence of operations on an operating machine of an industrial production line, the system comprising:
- at least one support structure movable by an operator for transporting pieces from a storage environment to a working environment close to the operating machine and for transporting pieces from the working environment to the storage environment, the support structure comprising a plurality of second areas each configured to support at least one respective piece of said pieces of the operating machine;
- a plurality of warning devices, including first warning devices installed on said operating machine and each being placed next to a respective first area of a plurality of first areas on said operating machine so as to be associated to said respective first area, and second warning devices installed on said support structure and each being placed next to a respective second area of said plurality of second areas on said support structure so as to be associated to said respective second area; and
- a control unit operatively connected to said warning devices and configured to selectively activate and deactivate said warning devices according to a predetermined sequence of commands to assist the operator in changing configuration of the operating machine, wherein said control unit executes:
- a first plurality of commands of said predetermined sequence of commands to cause the activation of at least one second warning device of said plurality of warning devices while keeping other warning devices of said plurality of warning devices deactivated, said at least one second warning device being associated to said respective second area of said plurality second areas in which pieces dismounted from said operating machine are to be placed on said support structure by the operator;
- a second plurality of commands of said predetermined sequence of commands to cause the activation of at least one second warning device of said plurality of warning devices while keeping other warning devices of said plurality of warning devices deactivated, said at least one second warning device being associated to the respective second area of the plurality of second areas from which pieces to be mounted on said operating machines are to be picked from said support structure by the operator;
- a third plurality of commands of said predetermined sequence of commands to cause the activation of at least one first warning device of said plurality of warning devices while keeping other warning devices of said plurality of warning devices deactivated, said at least one first warning device being associated to said respective first area of said plurality first areas from which at least one piece of said pieces of said operating machines are to be dismounted from said operating machine by the operator; and
- a fourth plurality of commands of said predetermined sequence of commands to cause the activation of at least one first warning device of said plurality of warning devices while keeping other warning devices of said plurality of warning devices deactivated, said at least one first warning device being associated to respective first area of said plurality of first areas on which at least one piece of said pieces is to be mounted on said operating machine by the operator.

* * * * *